(12) United States Patent
Specter et al.

(10) Patent No.: US 11,663,218 B2
(45) Date of Patent: May 30, 2023

(54) SYSTEMS AND METHODS FOR ASSOCIATING DUAL-PATH RESOURCE LOCATORS WITH STREAMING CONTENT

(71) Applicant: CGIP HOLDCO, LLC, Stamford, CT (US)

(72) Inventors: Jeffrey Specter, Stamford, CT (US); Vineet Choudhary, Austin, TX (US); Michael Agovino, Toluca Lake, CA (US)

(73) Assignee: CGIP HOLDCO, LLC, Stamford, CT (US)

( * ) Notice: Subject to any disclaimer, the term of this patent is extended or adjusted under 35 U.S.C. 154(b) by 690 days.

(21) Appl. No.: 16/574,640

(22) Filed: Sep. 18, 2019

(65) Prior Publication Data

US 2021/0081423 A1 Mar. 18, 2021

(51) Int. Cl.
*G06F 40/279* (2020.01)
*G06F 16/2455* (2019.01)
(Continued)

(52) U.S. Cl.
CPC ...... *G06F 16/24568* (2019.01); *G06F 40/279* (2020.01); *G06N 20/00* (2019.01); *H04L 67/1091* (2013.01)

(58) Field of Classification Search
CPC . G06F 16/24568; G06F 40/279; G06N 20/00; H04L 29/08522

(Continued)

(56) References Cited

U.S. PATENT DOCUMENTS

| 7,188,085 B2 | 3/2007 | Pelletier |
| 7,203,758 B2 | 4/2007 | Cook et al. |

(Continued)

FOREIGN PATENT DOCUMENTS

WO 2013138370 9/2013

OTHER PUBLICATIONS

Ljubojevic; the Analysis of the Users' Response to the Linear Internet Video Advertising by Using QOE Methods; Jun. 28, 2013.
(Continued)

*Primary Examiner* — Sibte H Bukhari
(74) *Attorney, Agent, or Firm* — Caldwell Intellectual Property Law

(57) ABSTRACT

A method of associating dual-path resource locators with streaming content includes receiving at least an identifier of a first third-party remote device, providing the at least an identifier in a data structure to a streaming content provider operating a second third-party remote device, receiving from the streaming content provider operating the second third-party remote device a selection of the at least an identifier in the data structure, generating a dual-path resource locator, wherein the dual-path resource locator identifies a first path to the first third-party remote device and a second path to the second third-party remote device which performed the selection, receiving from the second third-party remote device a continuous data stream containing audio content, detecting in the continuous data stream at least a data element relating to the dual-path resource locator and associating the dual-path resource locator with the continuous data stream.

14 Claims, 6 Drawing Sheets

(51) Int. Cl.
*G06N 20/00* (2019.01)
*H04L 67/1087* (2022.01)

(58) Field of Classification Search
USPC .......................................................... 709/203
See application file for complete search history.

(56) References Cited

U.S. PATENT DOCUMENTS

| | | | |
|---|---|---|---|
| 7,409,562 | B2 | 8/2008 | Kahn et al. |
| 8,244,596 | B2 | 8/2012 | Klinger et al. |
| 8,627,379 | B2 | 1/2014 | Kokenos et al. |
| 8,683,511 | B2 | 3/2014 | Lyon et al. |
| 9,264,471 | B2 | 2/2016 | Pichumani et al. |
| 9,264,750 | B2 | 2/2016 | Mathews et al. |
| 9,535,577 | B2 | 1/2017 | Spirer |
| 9,699,232 | B2 | 7/2017 | Drapeau et al. |
| 9,955,206 | B2 | 4/2018 | Jones et al. |
| 10,116,976 | B2 | 10/2018 | Shaw et al. |
| 10,347,370 | B1 * | 7/2019 | Kim ...................... G06F 16/254 |
| 2006/0129908 | A1 | 6/2006 | Markel |
| 2008/0065507 | A1 | 3/2008 | Morrison |
| 2012/0084812 | A1 | 4/2012 | Thompson |
| 2013/0151364 | A1 | 6/2013 | Reed, Jr. et al. |
| 2016/0164761 | A1 * | 6/2016 | Sathyanarayana ...... H04L 65/80 709/219 |
| 2016/0164923 | A1 * | 6/2016 | Dawes ................ H04L 65/4084 709/227 |
| 2016/0191984 | A1 | 6/2016 | Briggs et al. |

OTHER PUBLICATIONS

Feijoo; Exploring a Heterogeneous and Fragmented Digital Ecosystem: Mobile Content; Aug. 2009.

* cited by examiner

SYSTEMS AND METHODS FOR ASSOCIATING DUAL-PATH RESOURCE LOCATORS WITH STREAMING CONTENT

FIELD OF THE INVENTION

The present invention generally relates to the field of audio streaming. In particular, the present invention is directed systems and methods for associating dual-path resource locators with streaming content.

BACKGROUND

Association of resource locators with audio content by traditional manual and/or timing-based processes is labor intensive and can represent a prohibitive barrier to the establishment of such associations, particularly where streamed audio content is voluminous and may be transient. A result can be the balkanization of data according to content type, inhibiting connectedness in networked computing, with a concomitant loss of user access to resources that otherwise might be identified.

SUMMARY OF THE DISCLOSURE

In an aspect, a method of associating dual-path resource locators with streaming content. The method includes receiving, by at least a server, at least an identifier of a first third-party remote device. The method includes providing, by the at least a server, the at least an identifier in a data structure to a streaming content provider operating a second third-party remote device. The method includes receiving, by the at least a server and from the streaming content provider operating the second third-party remote device, a selection of the at least an identifier in the data structure. The method includes generating, by the at least a server, a dual-path resource locator, wherein the dual-path resource locator identifies a first path to the first third-party remote device based on the selection of the at least an identifier and a second path to the second third-party remote device which performed the selection. The method includes receiving, by the at least a server and from the second third-party remote device, a continuous data stream containing audio content. The method includes detecting, by the at least a server in the continuous data stream, at least a data element relating to the dual-path resource locator. The method includes associating, by the at least a server, the dual-path resource locator with the continuous data stream as a function of the at least a data element.

In another aspect, a system for associating dual-path resource locators with streaming content includes at least a server designed and configured to receive at least an identifier of a first third-party remote device, provide the at least an identifier in a data structure to a streaming content provider operating a second third-party remote device, receive, from the streaming content provider operating the second remote third-party device, a selection of the at least an identifier in the data structure, generate a dual-path resource locator, wherein the dual-path resource locator identifies a first path to the first third-party remote device based on the selection of the at least an identifier and a second path to the second third-party remote device which performed the selection, receive, from the second third-party remote device, a continuous data stream containing audio content, detect, in the continuous data stream, a data element relating to the dual-path resource locator, and associate the dual-path resource locator with the continuous data stream as a function of the at least a data element.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to methods that apply machine-learning processing algorithms to heterogenous linguistic datasets to display content from a third-party device based on selection by a streaming content provider. Content may include a textual element with an associated uniform resource locator (URL) related to the third-party remote device that is displayed on a user client device during a continuous data stream. Users who are listening to the streaming content will see the textual display of the third party upon the streaming content provider speaking a triggering work, wherein listeners may interact with the display and be redirected to a third-party's URL.

Figure 1:
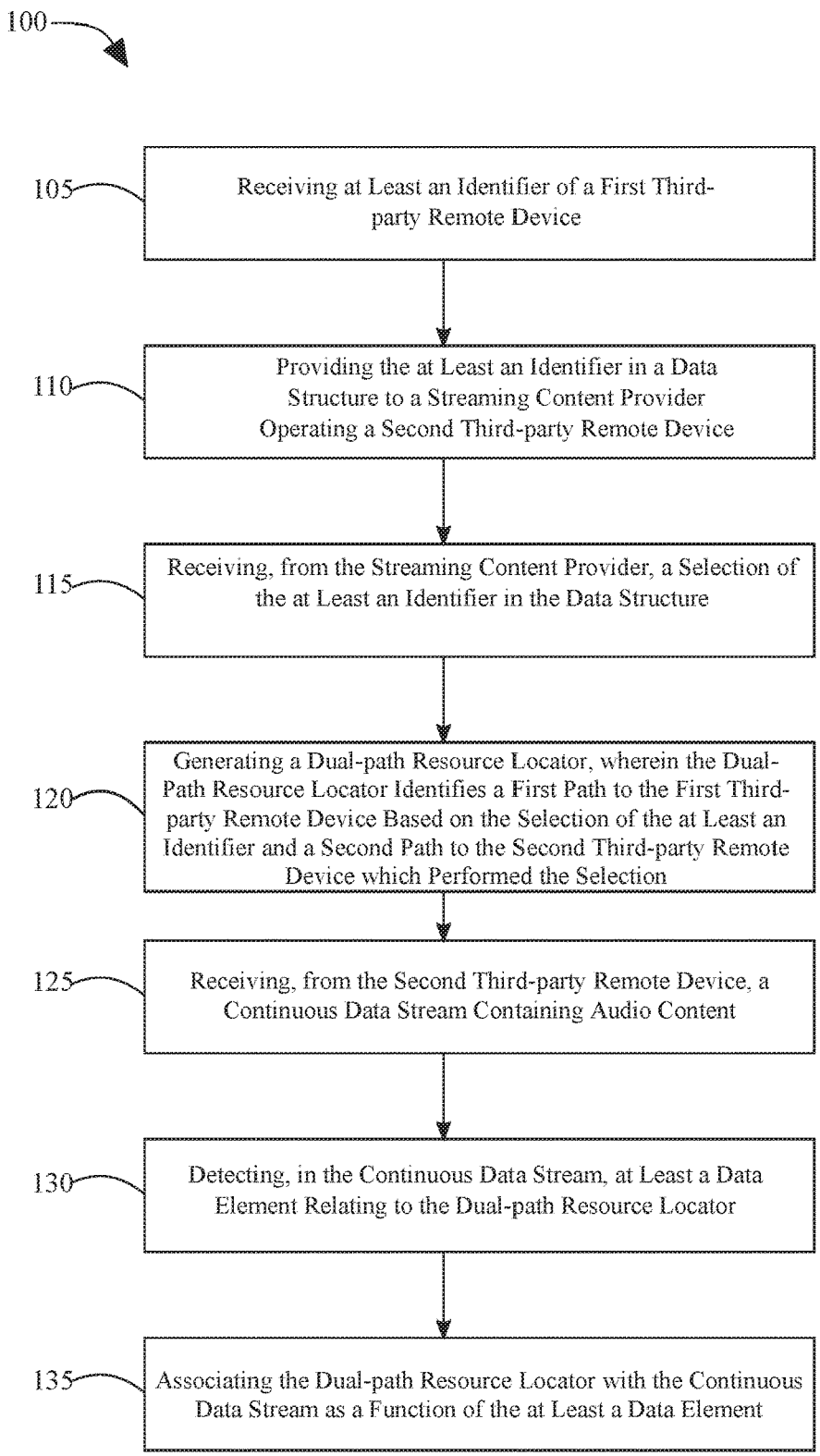
FIG. 1 is a flow diagram illustrating a method of associating dual-path resource locators with streaming content.
Figure 2:
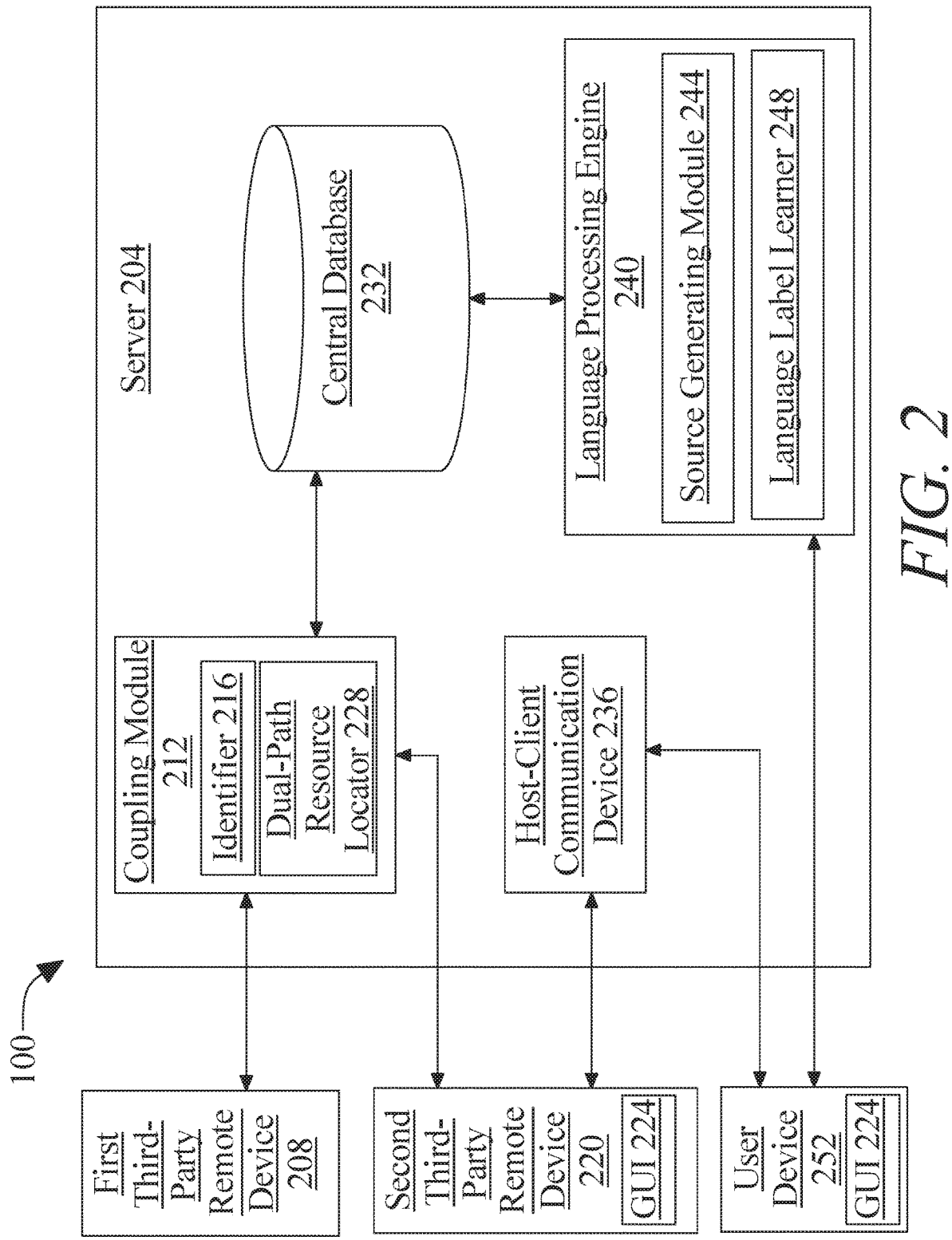
FIG. 2 is a block diagram of an exemplary streaming network according to an embodiment of the present invention.

Referring now to FIG. 1, an exemplary method 100 of associating dual-path resource locators with streaming content by at least a server. Method 100 may be implemented in a network, such as in exemplary streaming network 200 which contains server 204, as illustrated in FIG. 2, using a computing system, such as computing system 500 as described in further detail below. Such an exemplary streaming network 200 may be deployed using any embodiments of systems and/or elements thereof as described in U.S. Nonprovisional application Ser. No. 16/038,841, filed on Jul. 18, 2018, and entitled "A PLATFORM-AGNOSTIC THICK-CLIENT SYSTEM FOR COMBINED DELIVERY OF DISPARATE STREAMING CONTENT AND DYNAMIC CONTENT BY COMBINING DYNAMIC DATA WITH OUTPUT FROM A CONTINUOUS QUEUE TRANSMITTER," the entirety of which is incorporated herein by reference. As a non-limiting example, any display of any datum or element as described herein, including display fragments and/or client-side variants as described in further detail below, may be effected using any display section, content viewing portions, bars, extensions, content layer elements, or the like, suitable for display of any element to be displayed in any manner described in U.S. Nonprovisional application Ser. No. 16/038,841; furthermore, any dual-path resource locator as described in further detail herein may be included in and/or linked to any client redirection link as described in U.S. Nonprovisional application Ser. No. 16/038,841. Any streaming content may be provided according to any embodiment of any process, system, step, and/or component as described in U.S. Nonprovisional application Ser. No. 16/038,841; for instance, streaming may be performed by transmission of quanta of data over a network while continuously displaying such quanta in audio or visual form, by storing some such quanta of data in a buffer prior to display, and/or by storage on any device such as server 204 and/or any user device as a file to be played on demand. Such a computing system 500 may be a single computing system or a network of such or similar computing systems (e.g., a wide-area network, a global network (such as the Internet), and/or a local area network, among others), that is generally: 1) programmed with instructions for performing steps of a method of the present disclosure; 2) capable of receiving and/or storing data necessary to execute such steps; and 3) capable of providing any user interface that may be needed for a user to interact with devices on the streaming network system. Those skilled in the art will readily appreciate that aspects of the present disclosure can be implemented with and/or within any one or more of numerous devices, ranging from self-contained devices, such as a smartphone, tablet, computer, laptop computer, desktop computer, server, or web-server, to a network of two or more of any of these devices. For example, streaming network 200 and other aspects of server 204 may be contained within and/or implemented by one or more in-house systems, a centralized server, or a decentralized network of devices and/or software, among other implementations that will become readily apparent after reading this disclosure in its entirety. In some embodiments, depending on specific implementation, one or more steps of method 100 and/or any other method(s) incorporating features/ functionality disclosed herein may be implemented substantially in real-time.

Prior to describing exemplary method 100, parts of streaming network 200 will first be described to provide an exemplary context for method 100. Referring to FIG. 2, at least a server 204 may include any computing device as described below in reference to FIG. 4, including without limitation a microcontroller, microprocessor, digital signal processor (DSP) and/or system on a chip (SoC) as described below in reference to FIG. 4. Computing device may include, be included in, and/or communicate with a mobile device such as a mobile telephone or smartphone. At least a server 204 may include a single computing device operating independently, or may include two or more computing device operating in concert, in parallel, sequentially or the like; two or more computing devices may be included together in a single computing device or in two or more computing devices. At least a server 204 may connect to, communicate with, or otherwise interact with one or more additional devices as described below in further detail via a network interface device. Network interface device may be utilized for connecting a at least a server 204 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least a server 204 may include but is not limited to, for example, a at least a server 204 or cluster of computing devices in a first location and a second computing device or cluster of computing devices in a second location. At least a server 204 may include one or more computing devices dedicated to data storage, security, distribution of traffic for load balancing, and the like. At least a server 204 may distribute one or more computing tasks as described below across a plurality of computing devices of computing device, which may operate in parallel, in series, redundantly, or in any other manner used for distribution of tasks or memory between computing devices. At least a server 204 may be implemented using a "shared nothing" architecture in which data is cached at the worker, in an embodiment, this may enable scalability of method 100 and/or computing device.

Still referring to FIG. 2, streaming network 200 may include a first third-party remote device 208 configured to transmit information to a coupling module 212 of the at least a server 204. First third-party remote device 208 may be related to individuals, brokers, and/or other businesses that utilize identifiers to promote services during a continuous data stream of a streaming content provider. At least an identifier 216 as used herein includes a first path to the first third-party remote device 208, which may include, without limitation, a uniform resource locator ("URL"), as well as at least a set of instructions for at least a process to be performed on the first third-party remote device 208 and at least a set of rules associated with the at least a set of instructions to be accepted by a streaming host before the at least a process to be performed in a data structure. The at least an identifier 216 may include at least a keyword for triggering display of a textual element during a continuous data stream, which upon selection by a listener may direct the graphical user interface of a device to the first third-party remote device 208 interface. At least a set of rules may include without limitation terms set by first third-party remote device 208 involving monetary compensation for the accepting streaming host using a second third-party remote device 220 for allowing the textual element be displayed during a continuous data stream after said trigger word is spoken by the streaming host and for every listener which selects the textual element and is directed from the continuous data stream to the first third-party remote device 208 interface. Acceptance of rules associated with at least an identifier 216 may be considered as an agreement between first third-party remote device 208 and second third-party remote device 220.

Still referring to FIG. 2, selection and agreement to rules of at least an identifier 216 by streaming host of second third-party remote device 220 may be performed on a graphical user interface (GUI) 224, which may provide a streaming content provider with a field to indicate a selection of at least an identifier provided by a first third-party remote device 208 via coupling module 212. Selection and agreement to rules of at least an identifier 216 may then be sent to coupling module 212 of the at least a server 204 wherein a dual-path resource locator 228 is generated. Dual-path resource locator 228 identifies a first path to the first third-party remote device based on the selection of the at least an identifier and a second path to the second third-party remote device which performed the selection; as a non-limiting example, first path, may include a URL, directed towards first third-party remote device 208 and second path may include URL, associated with second third-party remote device 220; first path and/or second path may be contained in dual-path resource locator 228 and/or associated therewith via a data store and/or data structure linking dual-path resource locator 228 with first path and/or second path. For instance, and without limitation, one or both of first path and second path may be identified within system 200 via a code or other datum that may be used to retrieve and/or navigate to first path and/or second path, and which may be included in, associated with, or linked to dual-path resource locator 228. Dual path resource locator 228 may be stored in a central database 232 on the at least a server 204 in a multitude of forms including a data-structure or as described further below.

In continued reference to FIG. 2, second third-party remote device 220 may provide a continuous data stream of audio content to listeners on a server via a Host-client communication device 236 on the at least a server 204. Host-client communication device 236 may include any suitable hardware or software module. Host-client communication device 236 may be designed and configured to receive a continuous data stream from a second third-party remote device 220 and transmit the audio content of the continuous data stream to user device 252. Further, host-client communication device 236 transmits the continuous data stream as a corpus of data to a language processing engine 240 on server 204. In an embodiment, host-client communication device 236 may transmit a continuous data stream to a user device 252 operated by a user/listener and/or to language processing engine 240 on server 204.

In continued reference to FIG. 2, host-client communication device 236 may take in audio content from a second third-party remote device 220 and distribute the content to listeners on and/or in communication with at least a server 204. Audio content may be further processed through a language processing engine 240 for detection of any data elements contained in a dual-path resource locator 228 which may be stored in a central database 232 on the at least a server 204. Language processing engine 240 may take in a continuous corpus of data, defined as any collection of textual data elements, during a continuous data stream from the Host-client communication device 236 and generate, using a machine learning algorithm, a plurality of data elements. At least a data element may include information including but not limited to at least an auditory cue which when spoken and/or otherwise entered in a continuous data stream triggers generating of at least a textual output associated with and/or identifying dual-path resource locator 228. Language processing engine 240 may match at least a data element from the plurality of data elements within the corpus of data to generate the at least a textual output using a source generating module 244 on at least a server 204; this may be performed, without limitation, using a machine-learning algorithm as described in further detail below.

Source generating module 244 may generate at least a textual output by generating at least a query using the continuous data steam, determine that the at least a query includes at least a data element relating to the dual-path resource locator, and generate at least a textual output as a function of the at least a query; query may be any collection of data including the at least a data element. At least a textual output may be generated by a language label learner 248 operating on at least a server 204. Briefly, language label learner 248 may take as input the at least a data element; language label learner 248 may be designed and configured to generate at least a label output as a function of at least a data element and a training set correlating to first path of first third-party remote device 208 to an interactive textual element, receive, from language label learner 248, at least a label output, and generate the textual output using the at least a label output. A more detailed description relating to language processing engine, machine learning algorithm, training data, and the like is below in reference to FIG. 3.

With continued reference to FIG. 2, following detection of at least a data element relating to the dual-path resource locator 228 and generation of a textual element, dual-path resource locator 228 is associated with the continuous data stream. Association may involve, without limitation, generating a code corresponding to at least a textual output by source generating module 244 and transmitting the code to at least a user device 252. User device 252 may contain a graphical user interface (GUI) 256 for interacting with textual output and/or data, including without limitation any other contents of a continuous data stream, and may be any of the devices mentioned above. Upon user interaction with textual output graphical user interface of the at least a user device 252 may be directed to first path. Association of the dual-path resource locator 228 with the continuous data stream is described in more detailed below in FIG. 4.

Referring now to FIG. 1, exemplary method 100 includes step 105 at which at least a server 204 receives at least an identifier 216 of a first third-party remote device 208. Receiving at least an identifier may include receiving a first path to a first third-party remote device. Receiving at least an identifier may include receiving at least a set of instructions for at least a process to be performed on the first third-party device. First third-party remote device 208 may be linked, as a non-limiting example, to a vendor who provides a service. At least an identifier may include any information associated with third-party device and/or any entity, such as a vendor, linked thereto including entity and/or vendor name, a service provided by entity and/or vendor, a keyword or other textual datum for triggering a textual output during an audial or other continuous data stream, monetary compensation for a streaming content provider allowing for the textual output to be associated with their continuous data stream, a path such as without limitation a URL to a location of the third-party device such as a vendor and/or entity website, a set of rules for how an association during a continuous data stream, for instance as described below, may take place, and the like as mentioned above.

At step 110, and still referring to FIG. 1, at least a server 204 provides the at least an identifier 216 in a data structure to a streaming content provider operating a second third-party remote device 220. Streaming content provider here may be provided the at least an identifier 216 in any suitable data structure such as without limitation, a table, a memory address, an object in object-oriented programming, a variable or data type, or the like. Providing at least an identifier may include providing a user interface, such as a graphical user interface as described above, for selection of the at least an identifier. Streaming content provider and/or second third-party remote device may select at least an identifier 216 from the data structure; for instance by entering instructions or passing an argument and/or datum indicating acceptance; acceptance may indicate acceptance of rules and terms of an agreement for having a vendor textual output displayed during a continuous data stream provided by and/or from streaming content provider and/or second third-party remote device. A non-limiting example of this process is described below.

At step 115, and with continued reference to FIG. 1, at least a server receives, from second third-party remote device and/or streaming content provider operating the second third-party remote device, a selection of at least an identifier in the data structure. Second third-party remote device selection of at least an identifier 216 may be transmitted to the at least a server 204 such as in step 115; at least a server 204 and/or one or other element of system may verify that streaming content provider accepts the terms of such vendor. In a non-limiting example, transmission and/or acceptance of selection may be contingent on such acceptance, and/or upon one or more security steps such as authentication of second third-party remote device, streaming content provider, or other devices, persons, and/or entities in or interacting with system 100. Receiving a selection of at least an identifier may include receiving a second path to second third-party remote device, which may include any such path as described herein.

At step 120, and still referring to FIG. 1, at least a server 204 generates a dual-path resource locator 228. A "dual-path resource locator" as used in this disclosure is a data structure, which may include any collection of data stored according to any process, using any protocol, data storage facility, object, or other data storage process as described herein, identifying at least a first path, which may be and/or include any path as described in this disclosure, to a first device and a second path, which may be and/or include any path as described in this disclosure, to a second device; first device may be a distinct device from second device, and/or first path may be a distinct path from second path. Dual-path resource locator 228 identifies a first path to the first third-party remote device 208, which identification may be based on the selection of the at least an identifier 216, and a second path to the second third-party remote device 220 which performed the selection. Such paths may include any paths as described in this disclosure, including without limitation a URL associated with first third-party remote device 208 and second third-party remote device 220. Generating dual-path resource locator may include generating one or more uniform resource locators associated with first third-party remote device 208. All data associated with dual-path resource locator 228 may be stored on at least a server in a data structure or in central database 232.

At step 125, and continuing to refer to FIG. 1, the at least a server 204 receives a continuous data stream from a second third-party remote device 220; the continuous data stream may include a continuous data stream containing audio content. In a non-limiting illustration, individuals with user devices 246 connected to at least a server 204 may listen to continuous data stream and interact with such content through a graphical user interface on such user devices 246, for instance as described above. At least a server 204 may stream continuous data stream to one or more user devices 246, for instance by transmitting packets received with and/or in continuous data stream to the one or more user devices 246.

At step 130, and still referring to FIG. 1, at least a server 204 detects at least a data element in the continuous data stream. At least a data element relates to a dual-path resource locator 228 stored in central database 232, where relating to the dual-path resource locator 228 signifies identifying dual-path resource locator using any suitable identifier as described herein; identifier may include a textual datum and/or a spoken word, phrase, or other identifiable element of audio content. An example of the detection and rules for display may be seen here, as a non-limiting example, starting with an identifier associated with vendor "Star Coffee" who has elected "Star coffee" as the keyword/key-phrase for triggering display of their textual output. Continuing the above-described example, vendor may also have elected display of textual output for 2 minutes during a live stream after the streaming content provider says "Star coffee"; remuneration, such as a payment of $100 to streaming content provider by Star Coffee, and/or $20 for every user listening to the continuous data stream who selects the textual output and is directed to the vendor's site which is run by a third-party remote device, may be provided. Rules of an accepted agreement may contain more than one identifying keyword/key-phrase as well. Using an example in a similar non-limiting fashion with "all of our coffee sponsors," "Star Coffee,", and "Sun Coffee"; streaming content provider may, in a non-limiting example, say "Thanks to all of our coffee sponsors" and textual outputs for Star Coffee and Sun Coffee may either and/or both be displayed on user device 252 if associated with the live stream on server 204. This may be referred to as a category that relates to multiple data elements of multiple identifiers. Persons skilled in the art, upon reviewing the entirety of this disclosure, will be aware of various additional forms and/or examples thereof that identification may take. Detection may include without limitation, conversion of audio content and/or data to text using speech-to-text software, modules, and/or algorithms; such detection may include matching initially converted words to homonyms and/or near homonyms using a machine-learning process, which may be any as described below, trained using training data as described below that includes a plurality of entries correlating textual data to similar sounding words that may be mistakenly identified by speech-to-text facilities as described above. Such training data may be input by users, collected by error detection and/or as a result of user feedback, or the like.

With continued reference to FIG. 1, detection of at least a data element may involve use of a language processing engine, associated components, and a language processing algorithm as mentioned in FIG. 2 above. As a non-limiting example, detecting at least a data element relating to the dual-path resource locator of the continuous data stream may include extracting, by a language processing engine operating on the at least a server, a corpus of textual data from the continuous data stream. Language processing engine may generate, for instance and without limitation using at least a machine-learning algorithm and/or any other process described herein for a language processing engine, a plurality of data elements. Language processing engine may match, for instance by using at least a machine-learning algorithm and/or any other process described herein for matching textual data to other textual data, including without limitation vector-similarity tests or the like, at least a data element from the plurality of data elements in the corpus of data to at least an identifier of the first third-party remote device of the dual-path resource locator. A source generating module on the at least a server may generate at least a textual output from the matched at least a data element of the continuous data stream, and source generating module and/or at least a server may detect at least a data element relating to the dual-path resource locator as a function of the at least a textual output.

As a non-limiting example, and continuing to refer to FIG. 1, language processing engine may monitor all words spoken by the streaming content provider during a continuous data stream and process the corpus of data as mentioned in the description of FIG. 2; words may, as a non-limiting example, be converted to text using speech-to-text software, modules, and/or algorithms. Using the example previously mentioned, when "Star coffee" is said by the streaming content provider language processing engine may determine, for instance via comparison, matching, or other processes as described in this disclosure, that this phrase is a stored data element in dual-path resource locator in a data structure and/or data storage facility such as without limitation central database 232 and create a textual output based on the information found there. Further language processing specifics can be found below in the description of FIG. 3.

At step 135, and still referring to FIG. 1, at least a server 204 associates dual-path resource locator 228 with continuous data stream as a function of at least a data element; this may include, without limitation, displaying the interactive textual output on user devices 246. For instance, at least a server 204 and/or source generating module 244 may transmit at least a textual output to at least a user device communicating with the at least a server 204, which communication may include communication during and/or involving receiving the continuous data stream; at least a user device may include contains a graphical user interface as described in this disclosure for interacting with the textual output. In keeping with the previously mentioned example, and by way of illustration only, the phrase "Star coffee" will trigger the display of the appropriate textual output associated with that vendor on user devices 246 that are connected to the at least a server 204 and are streaming the continuous data stream for two minutes, wherein users may select the textual output and be redirected to a URL associated with the first third-party remote device.

Referring now to FIG. 2, data incorporated in and associated with dual-path resource locator 228 may be incorporated in one or more databases. As a non-limiting example, one or more elements of dual-path resource locators associated with third-party devices may be stored in and/or retrieved from a central database 232 on server 204. A central database 232 may include any data structure for ordered storage and retrieval of data, which may be implemented as a hardware or software module. A central database 232 may be implemented, without limitation, as a relational database, a key-value retrieval datastore such as a NOSQL database, or any other format or structure for use as a datastore that a person skilled in the art would recognize as suitable upon review of the entirety of this disclosure. Central database 232 may include a plurality of data entries with information related to possible data elements as described above. Data entries may include, without limitation, vendor information (vendor names, remote devices, markets, marketing costs, or the like), streaming content provider information (streaming content provider name, remote devices, marketing costs, or the like), paths such as URLs, textual elements, or the like which may be associated with data elements of dual-path resource locators. Information in data entries may further be associated with general marketing trends and marketing trends of the streaming content provider. Data entries in a central database 232 may be flagged with or linked to one or more additional elements of information, which may be reflected in data entry cells and/or in linked tables such as tables related by one or more indices in a relational database. Additional plausible processing of data entries in central database 232 is further described in FIG. 4 with reference to language processing engine 240.

Figure 3:
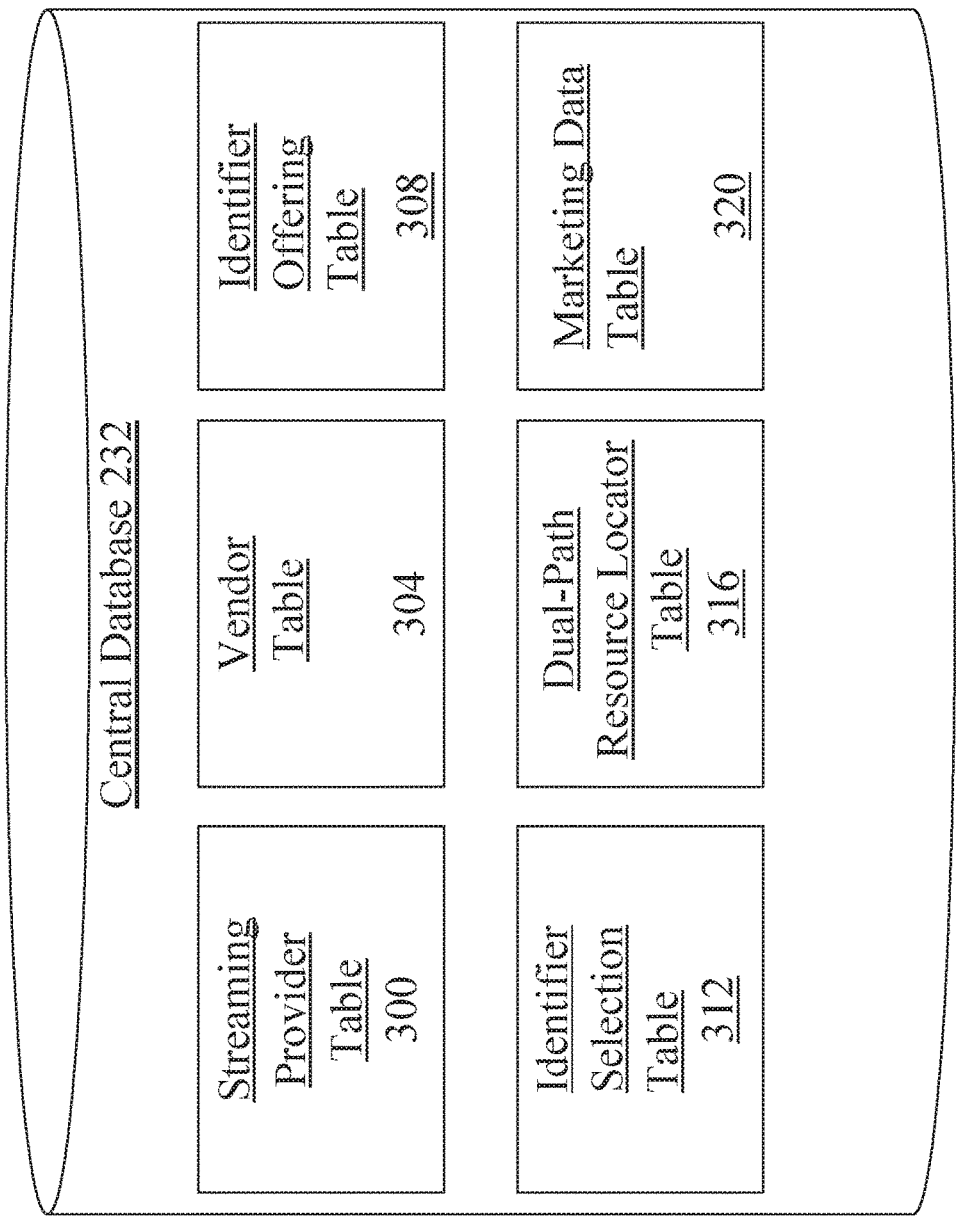
FIG. 3 is a block diagram illustrating an exemplary embodiment of a central database.

Referring now to FIG. 3, an exemplary embodiment of a central database 232 is illustrated. In general, central database 232 may organize data stored in the central database 232 according to one or more database tables. Central database 232 may include, as a non-limiting example, a streaming provider table 300. Streaming provider table 300 may be a table listing information related to a streaming content provider including provider name, path to at least a remote device used by the provider for selection of at least an identifier of a third-party remote device via first path, path to at least a remote device used by the provider for hosting of a continuous data stream via second path, marketing costs, or the like. As a further non-limiting example, central database 232 may include a vendor table 304 which may list at least a vendor name, path to at least a remote device used by the vendor for sending at least an identifier to a server associated with a streaming content provider via a path such as second path, path to at least a remote device associated with a textual element of a dual-path resource locator via a path, which may include any path as described in this disclosure including without limitation a URL, marketing costs, or the like. As another non-limiting example, central database 232 may contain an identifier offering table 308 which may list the at least an identifier from a vendor remote device offered to a streaming content provider, information associated with the at least an identifier further including: a path to the remote device of a vendor via a path such as first path and/or any path suitable for use as first path; at least a set of instructions for at least a process to be performed on the remote device of a vendor; at least a set of rules associated with the at least a set of instructions to be accepted by the streaming content provider before the at least a process is to be performed; at least a keyword for triggering display of a textual element during the continuous data stream of the streaming content provider; monetary compensation for the accepting streaming content provider using a second remote device for allowing the textual element be displayed during the continuous data stream after said trigger word is spoken by the streaming content provider and for every listener which selects the textual element and is directed from the continuous data stream to an interface of a first remote device of the vendor; or the like. As a further example, also non-limiting, central database 232 may include an identifier selection table 312 which may list the at least an identifier for which the streaming content provider has selected for association with the continuous data steam and where accompanying rules from vendor have been accepted, or the like. As a further non-limiting example, central database 232 may include a dual-path resource locator table 316 which may list second path, first path, a keyword for triggering a textual element display during the continuous data stream, or the like. Central database 232 may also include, as another non-limiting example, a marketing data table 320 which may list revenue generated by current and past dual-path resource locators for a streaming content provider, revenue generated in the general marketplace for dual-path resource locators associated with specific vendors, or the like. Persons skilled in the art, upon reviewing the entirety of this disclosure, will be aware of various ways in which data entries in a central database 232 may reflect and store information relating to a first third-party remote device 208, identifier 216, second third-party remote device 220, dual-path resource locator 228, and the like consistently within this disclosure with reference to FIG. 2.

Figure 4:
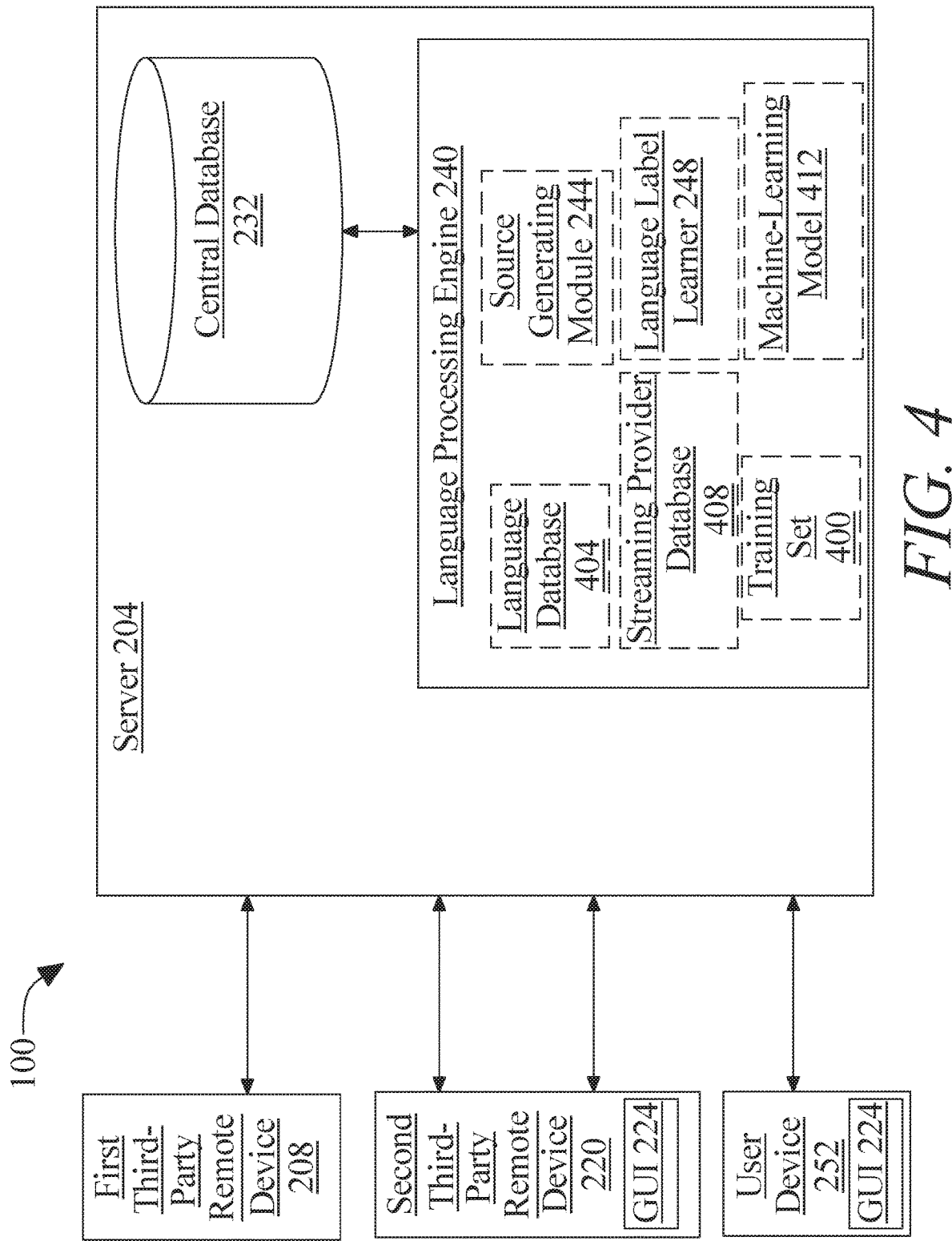
FIG. 4 is a block diagram of a language processing engine according to an embodiment of the present invention.

Now referring to FIG. 4, language processing engine 240 may include any suitable hardware or software module. Language processing engine 240 is designed and configured to receive at least a corpus of data from a continuous data stream and extract a plurality of data elements. At least a request for data element detection in a continuous data stream may be received from a second third-party remote device 220 via a Host-client communication device 236. A second third-party remote device 220 may include, without limitation, a display in communication with server 204; display may include any display as described in this disclosure. A second third-party remote device 220 may include an additional computing device, such as a mobile device, laptop, desktop computer, or the like; as a non-limiting example, the second third-party remote device 220 may be a computer and/or workstation operated by a user such as a streaming content provider.

With continued reference to FIG. 4, language processing engine 240 may extract data elements describing significant categories of device data, relationships of such categories to data elements, and/or significant categories of data elements from one or more continuous data streams. Data elements are related to at least a dual-path resource locator on the server and categories of data elements may relate to the same vendor of multiple resource locators or vendors in which have similar resource locators and are able to have textual outputs displayed simultaneously with a common word/phrase which define a common category. Language processing engine 240 may be configured to extract, from the one or more continuous data streams, one or more words. One or more words may include, without limitation, strings of one or characters, including without limitation any sequence or sequences of spoken letters, numbers, punctuation, diacritic marks, engineering symbols, chemical symbols and formulas, spaces, whitespace, and other symbols. This extracted information may be referred to at textual data. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 4, language processing engine 240 may compare extracted words to categories of data recorded on at least a server 204, one or more data elements recorded on at least a server 204, and/or one or more categories of data elements recorded on at least a server 204; such data for comparison may be entered on at least a server 204 as described above using data inputs from corpuses of data from a continuous data stream or the like. In an embodiment, one or more categories may be enumerated, to find total count of mentions in such corpuses of data. Alternatively or additionally, language processing engine 240 may operate to produce a language processing model. Language processing model may include a program automatically generated by at least a server 204 and/or language processing engine 240 to produce associations between one or more words extracted from at least a corpus of data and detect associations, including without limitation mathematical associations, between such words, and/or associations of extracted words with categories of data elements, relationships of such categories to data elements and/or categories of data elements. Associations between language elements, where language elements include for purposes herein extracted words, categories of device data, relationships of such categories to data elements, and/or categories of data elements may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of device data, a given relationship of such categories to data elements, and/or a given category of data elements. As a further example, statistical correlations and/or mathematical associations may include probabilistic formulas or relationships indicating a positive and/or negative association between at least an extracted word and/or a given category of user data, a given relationship of such categories to data elements, and/or a given category of data elements; positive or negative indication may include an indication that a given corpus of data is or is not indicating a data element of a dual-path resource locator or a data element within a category of dual-path resource locators. For instance, and without limitation, a negative indication may be given to a streaming content provider if an audio cue is given and not related to a dual-path resource locator in the database on the server, such as "no such vendor found," whereas a positive indication may be given to a streaming content provider if an audio cue is given and is associated with a dual-path resource locator in the database on the server, thus displaying the textual output of a vendor as described above with "Star Coffee." Whether a phrase, sentence, word, or other textual element in a corpus of data or corpus of corpuses of data constitutes a positive or negative indicator may be determined, in an embodiment, by mathematical associations between detected words, comparisons to phrases and/or words indicating positive and/or negative indicators that are stored in memory at least a server 204, or the like.

Still referring to FIG. 4, language processing engine 240 and/or at least a server 204 may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word category of device data, a given relationship of such categories to data elements, and/or a given category of data elements. There may be a finite number of categories of device data, given relationships of such categories to data elements, and/or data elements to which an extracted word may pertain; an HMM inference algorithm, such as the forward-backward algorithm or the Viterbi algorithm, may be used to estimate the most likely discrete state given a word or sequence of words. Language processing engine 240 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 4, language processing engine 240 may generate a vector space, which may be a collection of vectors, defined as a set of mathematical objects that may be added together under an operation of addition following properties of associativity, commutativity, existence of an identity element, and existence of an inverse element for each vector, and may be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which may be computed using a dot product of the two vectors divided by the lengths of the two vectors. Degree of similarity may include any other geometric measure of distance between vectors.

Still referring to FIG. 4, language processing engine 240 may use one or more corpuses of data to generate associations between language elements from a continuous data stream received by the language processing engine 240, and at least a server 204 may then use such associations to analyze words extracted from one or more corpuses of data and determine that the one or more corpuses of data indicate a data element associated with a dual-path resource locator 228 stored in a central database 232. In an embodiment, at least a server 204 may perform this analysis using a selected set of significant corpuses of data, such as corpuses of data identified by a continuous data stream or the like via second remote third-part device 220 using a graphical user interface as described in this application. Corpuses of data may be entered into at least a server 204 by being uploaded by the streaming content provider using second third-party remote device 220 via a continuous data stream or other persons using, without limitation, file transfer protocol (FTP) or other suitable methods for transmission and/or upload of corpuses of data; alternatively or additionally, where a corpus of data is identified by a citation, a uniform resource identifier (URI), URL, or other datum permitting unambiguous identification of the corpus of data, at least a server 204 may automatically obtain the corpus of data using such an identifier, for instance by submitting a request to a database or compendium of corpuses of data such as JSTOR as provided by Ithaka Harbors, Inc. of New York.

Continuing to refer to FIG. 4, whether an entry indicating significance of a category of device data, a given relationship of such categories to data elements, and/or a given category of data elements is entered via graphical user interface, alternative submission means, and/or extracted from a corpus of data or body of corpuses of data as described above, an entry or entries may be aggregated to indicate an overall degree of significance. For instance, each category of device data, a given relationship of such categories to data elements, and/or a given category of data elements may be given an overall significance score; overall significance score may, for instance, be incremented each time an expert submission and/or paper indicates significance as described above. Persons skilled in the art, upon reviewing the entirety of this disclosure will be aware of other ways in which scores may be generated using a plurality of entries, including averaging, weighted averaging, normalization, and the like. Significance scores may be ranked; that is, all categories of user data, relationships of such categories to data elements, and/or categories of data elements may be ranked according significance scores, for instance by ranking categories of user data, relationships of such categories to data elements, and/or categories of data elements higher according to higher significance scores and lower according to lower significance scores. Categories of user data, relationships of such categories to data elements, and/or categories of data elements may be eliminated from current use if they fail a threshold comparison, which may include a comparison of significance score to a threshold number, a requirement that significance score belong to a given portion of ranking such as a threshold percentile, quartile, or number of top-ranked scores. Significance scores may be used to filter outputs as described in further detail below; for instance, where a number of outputs are generated and automated selection of a smaller number of outputs is desired, outputs corresponding to higher significance scores may be identified as more probable and/or selected for presentation while other outputs corresponding to lower significance scores may be eliminated.

Still referring to FIG. 4, at least a server 204 may detect further significant categories of device data, a given relationship of such categories to data elements, and/or a given category of data elements using machine-learning processes as described in further detail below; such newly identified categories may be added to pre-populated lists of categories, lists used to identify language elements for language learning module, and/or lists used to identify and/or score categories detected in corpuses of data, as described above.

With continued reference to FIG. 4, language processing engine 240 may receive a training set correlating data elements to textual outputs. Training set may be received in the form of training data. Training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name and/or a description of a medical condition or therapy may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Continuing to refer to FIG. 4, in an embodiment, language processing engine 240 may be configured, for instance as part of receiving a training set 400, to associate at least a data element with at least a significant category associated with at least a dual-path resource locator from a list of significant categories of data elements. Significant categories of data elements may be acquired, determined, and/or ranked as described above. As a non-limiting example, data elements may be organized according to relevance to and/or association with a list of dual-path resource locators. A list of significant dual-path resource locators may include, without limitation, those that were accepted by the streaming content provider for having a vendor's textual element be displayed during a live stream. The list of significant dual-path resource locators may be updated with the streaming content provider accepting terms from third-party devices from new vendors or by updating the terms of current agreements, thus language processing engine 240 may modify list of significant categories to reflect changes.

Still referring to FIG. 4, data incorporated in training set 400 may be incorporated in one or more databases. As a non-limiting example, one or more data elements of dual-path resource locators associated with third-party devices may be stored in and/or retrieved from a language database 404, with language database 404 extracting some information from data entries contained in central database 232. A language database 404 may include any data structure and/or data storage suitable for use as a central database 232 as described above. Language database 404 may be more specifically associated with data entries involving general marketing trends and/or user interaction with textual outputs from past interactions for formulations of conclusions regarding likelihood of user interaction. Such conclusions may have been generated by language processing engine 240 in previous iterations of methods. Data entries in a language database 404 may be flagged with or linked to one or more additional elements of information, which may be reflected in data entry cells and/or in linked tables such as tables related by one or more indices in a relational database; one or more additional elements of information may include data associating at least a data element with one or more dual-path resource locators, and/or information related to data entries mentioned above. Additional elements of information may include descriptions of particular methods used to extract data elements, matching such data elements with a dual-path resource locator, and associating the dual-path resource locator with a continuous data stream by the steaming content provider. Persons skilled in the art, upon reviewing the entirety of this disclosure, will be aware of various ways in which data entries in a language database 404 may reflect the data elements which relate to the original identifiers from a first third-party remote device 208, the corresponding dual-path resource locator 228 stored in a central database 232, and a continuous data stream by the second third-party remote device 220 consistently within this disclosure.

Referring again to FIG. 4, language processing engine 240 and/or another device in language processing engine 240 may populate one or more fields in language database 404 using streaming content provider input via second third-party remote device 220, which may be extracted or retrieved from a streaming provider database 408. A streaming provider database 408 may include any data structure and/or data store suitable for use as a central database 232 and language database 404 as described above. Streaming provider database 408 may include data entries reflecting one or more streaming content provider submissions of data such as may have been submitted according to any process described above in reference to FIG. 2, including without limitation by using graphical user interface (GUI) 224. Streaming provider database 408 may include one or more fields generated by language processing module 216, such as without limitation fields extracted from one or more corpuses of data as described above. For instance, and without limitation, one or more categories of data elements and/or related dual-path resource locators and/or categories of data elements as described above may be stored in generalized form in a streaming provider database 408 and linked to, entered in, or associated with entries in a language database 404. Dual-path resource locators may be stored and/or retrieved by language processing engine 240 and/or language database 404 and/or streaming provider database 408 and/or central database 232; all such storage devices listed may include any data structure and/or data storage components suitable for use as was described in the language database 404 above. Dual-path resource locators in any of the listed storage components may be linked to and/or retrieved following a keyword/key-phrase spoken by the streaming content provider using identifiers such as URI and/or URL data, vendor data, or the like; persons skilled in the art, upon reviewing the entirety of this disclosure, will be aware of various ways in which dual-path resource locators may be indexed and retrieved according to vendor, subject matter, speech, or the like as consistent with this disclosure.

Referring still to FIG. 4, language database 404 may be used to store label outputs used by language processing engine 240, including any label outputs correlated with data elements in training set 400 as briefly described above with more detail below. Label outputs may be linked to or refer to entries in language database 404 to which label outputs correspond. Linking may be performed by reference to historical data concerning relationships between a label output and a data element in language database 404 and may be determined by reference to a record in a streaming provider database 408 linking a given label output to a given category of data elements as described above.

Referring still to FIG. 4, training set 400 may be populated by retrieval of one or more data elements from language database 404 and/or steaming provider database 408. In an embodiment, entries retrieved from language database 404 and/or steaming provider database 408 may be filtered and/or selected via query to match one or more elements of information as described, so as to retrieve a training set 400 including data belonging to a given dual-path resource locator, data element, vendor, and/or other set, so as to generate outputs as described below that are tailored to a first third-party remote device 208 with regard to what language processing engine 240 classifies as a data element of a dual-path resource locator during a continuous data stream. Persons skilled in the art, upon reviewing the entirety of this disclosure, will be aware of various ways in which data elements may be retrieved from language database 404 and/or steaming provider database 408 to generate a first training set to reflect specific vendor data pertaining to a selected vendor by a streaming content provider of a second third-party remote device 220, including without limitation a vendor's textual output during a continuous data stream with regard to what at least a dual-path resource locator contains as described in further detail below. Language processing engine 244 may alternatively or additionally receive a training set 400 and store one or more entries in language database 404 and/or steaming provider database 408 as extracted from elements of training set 400.

In an embodiment, and still referring to FIG. 4, language processing engine 240 may receive an update to one or more elements of data represented in training set 400, and may perform one or more modifications to training set 400, or to language database 404, and/or streaming provider database 408 as a result. For instance, a data element may turn out to have been erroneously recorded; language processing engine 240 may remove it from training set 400, language database 404, and/or streaming provider database 408 as a result. An agreement for presentation of a vendor's textual element during a continuous data stream by a streaming content provider may also expire resulting in removal of a data element and/or dual-path resource locator.

Continuing to refer to FIG. 4, elements of data training set 400, language database 404, and/or streaming provider database 408 may have temporal attributes, such as timestamps; language processing engine 240 may order such elements according to recency, select only elements more recently entered for training set 400, or otherwise bias training sets, database entries, and/or machine-learning models as described in further detail below toward more recent or less recent entries. Persons skilled in the art, upon reviewing the entirety of this disclosure, will be aware of various ways in which temporal attributes of data entries may be used to affect results of methods and/or systems as described herein.

With continued reference to FIG. 4, language processing engine 240 may include a language label learner 248 operating on the language processing engine 240, the language label learner 248 designed and configured to generate the at least a label output as a function of the training set 400 and the at least a data element. Language label learner 248 may include any hardware and/or software module. Language label learner 248 is designed and configured to generate outputs using machine learning processes. A machine learning process, as used in this disclosure, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Still referring to FIG. 4, language label learner 248 may be designed and configured to generate at least a label output by creating at least a machine-learning model 412 relating data elements of dual-path resource locators to interactive textual elements of textual outputs using the training set 400. Language label learner 248 may be designed and configured to generate at least a label output using the machine-learning model 412 for generation of a textual output. At least a machine-learning model 412 may include one or more models that determine a mathematical relationship between data elements of dual-path resource locators to textual outputs. Such models may include without limitation model developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithm used to generate machine-learning model 412 may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

In an embodiment, and continuing to refer to FIG. 4, language label learner 248 may generate a plurality of label outputs associated with multiple data elements relating to textual outputs from specific words/phrases extracted from a continuous data stream. For instance, where a keyword/keyphrase related to a data element may have multiple meanings or closely resemble other words/phrases during continuous data stream. In such a situation, language label learner 248 and/or language processing engine 240 may perform additional processes to resolve this ambiguity. Processes may include presenting multiple possible textual outputs relating to a word/phrase to streaming content provider via GUI 224 of second third-party remote device 220 to allow for the provider to manually make the decision to display a textual output to listeners or not. Alternatively or additionally, processes may include additional machine learning steps; for instance, where reference to a model generated using supervised learning on a limited domain has produced multiple mutually exclusive results and/or multiple results that are unlikely all to be correct, or multiple different supervised machine learning models in different domains may have identified mutually exclusive results and/or multiple results that are unlikely all to be correct. In such a situation, language label learner 248 and/or language processing engine 240 may operate a further algorithm to determine which of the multiple outputs is most likely to be correct. Results may be presented and/or retained with rankings, for instance to advise a streaming content provider with which textual output have the most user interaction and thus are most reliable.

In continued reference to FIG. 4, upon a label output generation by language label learner 248, source generating module 244 may receive such label output to generate the textual output associated with the at least a data element and a dual-path resource locator 228. Display to a graphical user interface (GUI) 256 of a user device 252 may be done by source generating module 244 associating the generated textual output during a continuous data stream with code. Code, or "source code," may be any collection of code, possibly with comments, written using a human-readable programming language, usually as plain text. The source code of a program is specially designed to facilitate the work of computer programmers, who specify the actions to be performed by a computer mostly by writing source code. The source code is often transformed by an assembler or compiler into binary machine code understood by the computer. The machine code might then be stored for execution at a later time. Alternatively, source code may be interpreted and thus immediately executed as may be done herein by source generating module 244 after receiving a label output. Textual output herein may contain a URL and an interactive textual element which is displayed on user device 252, wherein an operator of user device may interact/select the textual output during the continuous data stream and be directed to the associated URL of a first third-party remote device 208. In doing so, streaming content provider may be rewarded by the vendor of first third-party remote device 208 for every time a user is directed from a streaming content provider's continuous data stream to the path of the first third-party remote device 208.

Figure 5:
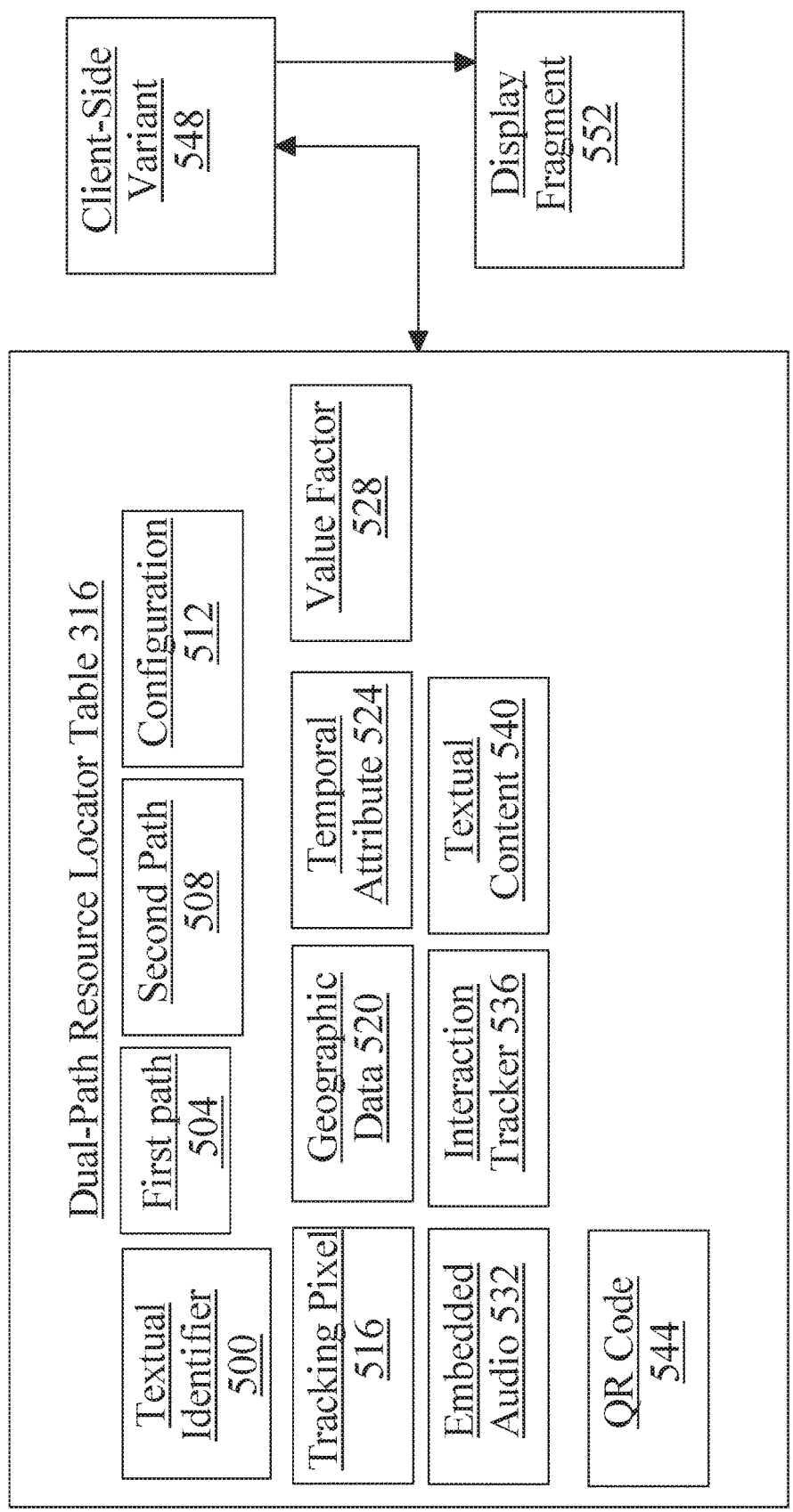
FIG. 5 is a block diagram illustrating a dual-path resource locator table according to an embodiment of the present invention.
Figure 6:
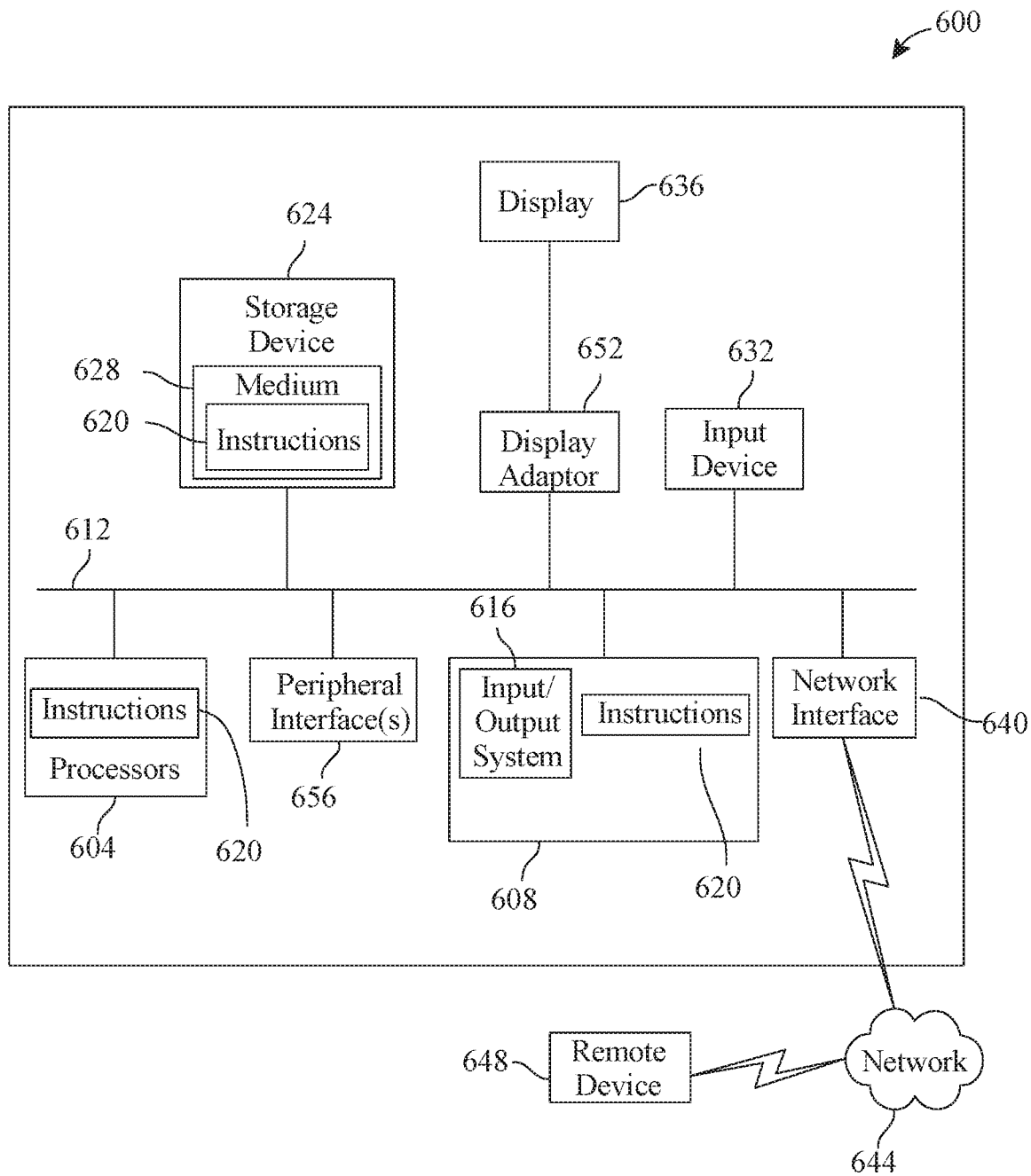
FIG. 6 is a block diagram of a computing system that can be used to implement any one or more of the methodologies disclosed herein and any one or more portions thereof.

Referring now to FIG. 5, an exemplary embodiment of one or more elements that may be included in dual-resource locator 228 as described above is illustrated. Such attributes may, without limitation, be stored in dual-path resource locator table 316, for instance as described above in reference to FIG. 3, and/or in any other suitable data structure or memory resource as described in this disclosure. Attributes may include, without limitation, a textual identifier 500, which may include any string of textual data, which may be used in system 200 to identify dual-path resource locator 228 in system and/or to users. Attributes may include, without limitation, first path 504, which may include any first path as described above, including without limitation a URL; first path may further contain textual identifier 500 and/or a reference thereto. Attributes may include second path 508, first path 504, which may include any second path as described above, including without limitation a URL; second path may further contain textual identifier 500 and/or a reference thereto. Attributes may include configuration 512, which may include any element of data instructing first third-party remote device 208 to act upon activation of dual-path resource locator, including, without limitation, transactions to be performed upon activation. Attributes may include a tracking pixel 516 for online activity and/or redemption at first third-party remote device 208.

Still referring to FIG. 5, attributes may include one or more elements of navigational or geographical data 520, which may be used, for instance, to determine where a user device is located at a moment of activation or afterwards; for instance, one or more terms may require that a user device, as tracked by GPS or similar location and/or navigation systems, travel to a particular point such as a retail location or the like, prior to accessing value provided to a user of user device. As a further non-limiting example, user device and/or user thereof may be tracked using geographical data 520 to determine user activity subsequent to activation of dual-path resource locator 228; this may be used, without limitation, to modify configuration 512 based on one or more geographical factors. As an additional non-limiting example, configuration 512 may include an instruction for first third-party remote device 208 to engage in a particular sequence of actions upon activation of dual-path resource locator 228 only if a user device is located in a particular location.

Continuing to refer to FIG. 5, one or more attributes may include a temporal attribute 524; temporal attribute may include an attribute indicating how one or more other attributes may change based on a period of time from creation, modification, and/or activation of dual-path resource. For instance, a temporal attribute 524 may indicate an "expiration date" after which first third-party remote device 208 will not perform one or more actions, such as for instance, conferring a value upon an activating user, for that user and/or for all users, an "activation time" after which first third-party remote device 208 will perform one or more actions, will modify one or more actions to be performed, or the like; this may cause system to modify configuration 512 automatically upon detecting that a period of time established in temporal attribute 524 has elapsed. One or more attributes may include at least a value factor 528, which may direct system 200 to modify a display of dual-path resource locator 208, such as without limitation changing display color, font, image, audio, or the like, upon a modification of any attribute as described herein.

Still referring to FIG. 5, attributes may include one or more elements of embedded audio 532, which may indicate and/or include at least an element of streaming data that may be provided upon display, activation, or any other activity involving dual-path resource locator 228; for instance, and without limitation, audio message may connected to a display such as a display bar or other such element and/or may include pausing a podcast to play the audio message and reconnecting to the podcast, causing it to continue streaming, at end. Audio message linked may describe, without limitation, a temporal attribute 524, such as "for the next 60 seconds only, you can get x for y". Attributes may include an interaction tracker 532, which may record a history of activations, deployment, association with streaming content, and/or other use of dual-path resource locator 228, which may be tracked, for instance, according to times of occurrence, locations of occurrence, users and/or user devices performing one or more actions, or the like. Attributes may include one or more additional elements of textual content 540, which may include any textual content to be displayed with dual-path resource locator, including without limitation on mouse-over, during activation, "on click" events, on touch events, events triggered by and/or after activation, automatic triggering push, voice-activation, or any other event handlers that may occur to a person skilled in the art upon reviewing the entirety of this disclosure. Attributes may include a QR code 544 or the like that may be linked to dual-path resource locator 228. Additional attributes may, e.g., specify particular users that may activate code, particular sequences of actions after or in conjunction with activation that may be required for a user to receive a value associated with dual-path resource locator 228, or the like. Attributes may include images and/or video content. Persons skilled in the art, upon reviewing the entirety of this disclosure, will be aware of various additional examples of data that may be included in attributes.

With continued reference FIG. 5, system 200 may be configured to include one or more subsets of attributes in a client-side variant 548, which may be deployed on a client-side device such as without limitation using a native application, a web browser, or the like. Client-side variant 548 may include some attributes while excluding other attributes, or may include all attributes included for a given dual-path resource locator or set of dual-path resource locators. A set of dual-path resource locators may include a set identified may having identical or related attributes for any attribute field described above in dual-path resource locator table 316; as a non-limiting example, a set may be defined as containing records in dual-path resource locator table 316 having identical first path 504 and/or second path 508 data. As a further non-limiting example, a first record may be included in a set with at least a second record where each of the first record and the at least a second record has a first path 504 indicating a device or devices operated by the same entity, whether the indicated devices themselves are identical; in other words, a set may be made of dual-path resource locators having first paths 504 identifying identical entities. As a further non-limiting example, a first record may be included in a set with at least a second record where each of the first record and the at least a second record has a second path 508 indicating a device or devices operated by the same entity, whether the indicated devices themselves are identical; in other words, a set may be made of dual-path resource locators having second paths 508 identifying identical entities Transmission to a user client device of client-side variant 548 may be performed automatically; for instance, and without limitation when user is receiving streaming content from, originating at previously, and/or associated with second third-party remote device, a client-side variant containing a set of records having second paths 508 indicating second third-party remote device 220 or devices associated with an entity operating second third-party remote device may automatically be transmitted to user client device. Alternatively or additionally, client-side variant 548 may be transmitted to user client device in response to a user interaction with user client device and/or user-entered command, such as a user activation of a dual-path resource locator 228, identifier, and/or a display fragment as described below, a user response in the affirmative to a prompt asking whether user wishes to display a particular client-side variant 548 and/or a set of records encompassed therein, or a user command requesting display of a particular client-side variant 548 and/or a set of records encompassed therein. A user action prompting display of client-side variant 548 may cause display of records transmitted to user client device in the past, and/or a particular set of records, such as the set of records associated with a second third-party remote device 200 associated with currently playing or displaying streaming content, a set of records associated with a particular user, and/or a set of records matching on any attribute of dual-path resource locator table 316. A user may be able to "search" such records by entering a value and/or query; in response, server 204 and/or host-client communication device 236 may cause user client device 252 to display records having attributes matching the entered value and/or query.

Still referring to FIG. 5, server 204 and/or host-client communication device 236 may cause user device 252 to display a display fragment 552; display occur, without limitation, in response to detection of at least a data element relating to dual-path resource locator and/or as part of association of the dual-path resource locator with the continuous data stream as a function of at least a data element detected therein, as described above. Display fragment 552 may contain any attribute or combination of attributes described above for dual-path resource locator table. In an embodiment, server 204 and/or host-client communication device 236 may configure user device 252 to generate and/or cause display of display fragment 552 containing at least a selected attribute. For instance, at least a selected attribute may include textual identifier 500. As another example, at least a selected attribute may include textual content 540. As another example, at least a selected attribute may include an image; an image may, for instance be stored as another attribute of table 316 and/or client-side variant 548. As another example, at least a selected attribute may include QR code. Selection of at least a selected attribute may be performed, by any device or module performing such selection, using one or more context datums. One or more context datums may include, without limitation, user identity, geographic location, user history of interactions with dual-path resource locators, user history of interactions with streaming content, user preferences, or the like. As a non-limiting example, where geographic location of user, as detected using GPS or the like, indicates that user is located near to a retail establishment operated by an entity associated with first third-party remote device, where "near to" means within some threshold distance or travel time, QR code may display; QR code may not display when geographical location is beyond threshold distance. Alternatively or additionally, any other attribute may display, including without limitation textual identifier 500, textual content 540, image data, or any other attribute; for instance, and without limitation, voice data may be displayed and/or output, including without limitation using any display elements described in this disclosure or in any disclosure incorporated by reference herein and/or by outputting and/or displaying any streaming content described in this disclosure and/or in any disclosure incorporated by reference herein. As another example, a history of user interaction with dual-path resource locators may indicate that a particular user and/or a user of user device 252 activates dual-path resource locators more frequently when display fragment 552 includes an image than when it does not; at least a selected attribute may therefore include an image. Persons skilled in the art, upon reviewing the entirety of this disclosure, will be aware of various ways in which selection of at least a selected attribute may be performed consistently with this disclosure. Selection by user of display fragment 552, for instance by "clicking" on or touching such display fragment 552 as displayed on user device 252, by entering a voice input that activates dual-path resource locator, or the like, may cause display of some or all of client-side variant 548, for instance by causing it to display on GUI from local storage on user device or by fetching it and causing it to display after receipt.

Embodiments presented herein may enable efficient deployment of an exchange or marketplace that pairs content creators with entities proffering marketing messages (audio, text and or video) that feature interactive promotional codes and other methods designed to enable them to offer consumers a discount, special offer, or unique access to the entity. These interactive capabilities, which may be referred to as "smart codes" may be linked to various participants (such as without limitation content creators and marketers) and may be, as a non-limiting example, primarily associated with messages that are in audio form; advantageously, such messages may not be required to conform to the traditional lengths or styles that are typical with standard marketing messages. Smart codes may also be associated with other marketing forms, such as video or text. The above-described technology solves problems inherent in network-based advertisement and communication by permitting a seamless integration of messages, network paths, and streaming media; the means and methods employed obviate the need for manual intervention in association of such communication with such media, permitting streaming content providers a previously impossible degree of real-time content association. Embodiments may enable the process for the content creator and marketer to configure the behavior of smart codes, the benefits given to the consumer, and the terms between the content creator and marketer. Display of smart codes using various user interface methods may advantageously make it easier and intuitive for the consumer to interact with the smart code and participate in the offers, discounts, exclusive access, that the marketer is offering. Based on triggers created by the messages, smart codes may be displayed via various user interfaces a user would utilize to experience media; such displays may enable interactions such as redeeming a unique code agreed upon by a content creator and the marketer to enable a benefit to an activating user. Code triggers may include without limitation tagging, audio recognition, geolocation cues, push notifications, historical reference lists, and/or other triggering events as described above.

As a further non-limiting example, embodiments described herein may be incorporated in and enable an audio playback player with a visual user interface that is context-aware of the content it is playing; the audio player may track playback of specific audio encoded with metadata synced to timestamps of the audio—when playback hits the encoded timestamps the audio player user interface displays relevant associated information, such as smart codes, based on the timestamp metadata. A user may be able to click, touch, or use voice for immediate redemption at the advertiser's site. Alternatively, or additionally, a user based on geolocation may have the Smart Code automatically display in their device to show at a retail location. As an additional non-limiting example, an interface may keep a catalog (or historical wallet) of all smart codes available for the user, allowing a user to reference any opportunity the user would like to take advantage of at their leisure. Encoding of the metadata to timestamps of the audio file may happen manually in a database or automatically via audio recognition technology which "listens" for key phrases associated with the metadata; for instance, in methods as described above, detection of a data element in a continuous data stream may be coupled with clock-based measurements to create a timestamp indicating a time within streaming content for display of, for instance a display fragment as described above. Methods for presenting Smart Codes for the user to interact with as described above may make the process of offer redemption dramatically more intuitive, ultimately driving higher sales for marketers, and opening new revenue generation capability for all content creators.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 4 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions may be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of associating dual-path resource locators with streaming content, the method comprising:
    receiving, by at least a server, at least an identifier of a first third-party remote device;
    providing, by the at least a server, the at least an identifier in a data structure to a streaming content provider operating a second third-party remote device;
    receiving, by the at least a server and from the streaming content provider operating the second third-party remote device, a selection of the at least an identifier in the data structure;
    generating, by the at least a server, a dual-path resource locator, wherein the dual-path resource locator identifies a first path to the first third-party remote device based on the selection of the at least an identifier and a second path to the second third-party remote device which performed the selection;
    receiving, by the at least a server and from the second third-party remote device, a continuous data stream containing audio content;
    detecting, by the at least a server in the continuous data stream, at least a data element relating to the dual-path resource locator, the detecting of the at least a data element comprising:
        extracting, by a language processing engine operating on the at least a server, a corpus of textual data from the continuous data stream; and
        generating, by the language processing engine, a plurality of data elements;
        matching, by the language processing engine, at least a data element from the plurality of data elements in the corpus of data to the at least an identifier of the first third-party remote device of the dual-path resource locator;
        generating, by a source generating module on the at least a server, at least a textual output from the matched at least a data element of the continuous data stream, wherein generating the at least a textual output by the source generating module further comprises:
            generating at least a query using the continuous data stream;
            determining that the at least a query includes at least a data element relating to the dual-path resource locator; and
            generating the at least a textual output as a function of the at least a query, wherein the method further comprises:
                inputting the at least a data element to a language label learner operating on the at least a server, wherein the language label learner is designed and configured to generate at least a label output as a function of the at least a data element and a training set correlating data elements and label outputs;
                receiving, from the language label learner, the at least a label output; and
                generating the at least a textual output using the at least a label output; and
        detecting the at least a data element relating to the dual-path resource locator as a function of the at least a textual output; and
    associating, by the at least a server, the dual-path resource locator with the continuous data stream as a function of the at least a data element.

2. The method of claim 1, wherein receiving the at least an identifier further comprises receiving the first path to the first third-party remote device and at least a set of instructions for at least a process to be performed on the first third-party device.

3. The method of claim 1, wherein providing the at least an identifier further comprises providing a user interface for selection of the at least an identifier.

4. The method of claim 1, wherein receiving a selection of the at least an identifier further comprises receiving the second path to the second third-party remote device.

5. The method of claim 1, wherein generating the dual-path resource locator further comprises generating one or more uniform resource locators associated with the first third-party remote device.

6. The method of claim 1, wherein generating the dual-path resource locator further comprises storing the dual-path resource locator in a database and/or data structure on the at least a server.

7. The method of claim 1, wherein associating the dual-path resource locator with the continuous data stream further comprises;
   transmitting, by the source generating module, the at least a textual output to at least a user device communicating with the at least a server during the continuous data stream, wherein the at least a user device contains a graphical user interface for interacting with the textual output.

8. The method of claim 7, wherein interacting with the textual output directs the user client device interface to the first path of the first third-party remote device.

9. A system for associating dual-path resource locators with streaming content comprising:
   at least a server comprising a processor and a memory, the at least a server designed and configured to:
      receive at least an identifier of a first third-party remote device;
      provide the at least an identifier in a data structure to a streaming content provider operating a second third-party remote device;
      receive, from the streaming content provider operating the second remote third-party device, a selection of the at least an identifier in the data structure;
      generate a dual-path resource locator, wherein the dual-path resource locator identifies a first path to the first third-party remote device based on the selection of the at least an identifier and a second path to the second third-party remote device which performed the selection;
      receive, from the second third-party remote device, a continuous data stream containing audio content;
      detect, in the continuous data stream, a data element relating to the dual-path resource locator; and
      associate the dual-path resource locator with the continuous data stream as a function of the at least a data element;
   a language processing engine operating on the at least a server, wherein the language processing engine is designed and configured to extracting corpus of textual data from the continuous data stream, generate, using the at least a machine-learning algorithm, a plurality of data elements, and match, using at least a machine-learning algorithm, at least a data element from the plurality of data elements in the corpus of data to the at least an identifier of the first third-party remote device of the dual-path resource locator; and
   a source generating module on the at least a server, the source generating module designed and configured to:
      generate at least a textual output from the matched at least a data element of the continuous data stream, wherein generating the at least a textual output by the source generating module further comprises:
         generating at least a query using the continuous data stream;
         determining that the at least a query includes at least a data element relating to the dual-path resource locator; and
         generating the at least a textual output as a function of the at least a query, wherein the source generating module is further configured to:
            input the at least a data element to a language label learner operating on the at least a server, wherein the language label learner is designed and configured to generate at least a label output as a function of the at least a data element and a training set correlating data elements and label outputs;
            receive, from the language label learner, the at least a label output; and
            generate the at least a textual output using the at least a label output; and
      detect the at least a data element relating to the dual-path resource locator as a function of the at least a textual output.

10. The system of claim 9, wherein the source generating module is further configured to associate the dual-path resource locator with the continuous data stream by transmitting, by the source generating module, the at least a textual output to at least a user device communicating with the at least a server during the continuous data stream, wherein the at least a user device contains a graphical user interface for interacting with the textual output.

11. The method of claim 10, wherein interacting with the textual output directs the user client device interface to the first path of the first third-party remote device.

12. The system of claim 9, wherein the at least an identifier further comprises the first path to the first third-party remote device and at least a set of instructions for at least a process to be performed on the first third-party device.

13. The system of claim 9 further comprising a user interface for selection of the at least an identifier.

14. The system of claim 9, wherein generating the dual-path resource locator further comprises generating one or more uniform resource locators associated with the first third-party remote device.

* * * * *